Patented Jan. 8, 1946

2,392,531

UNITED STATES PATENT OFFICE 2,392,531

PRODUCTION OF WATER-SOLUBLE BASIC ALUMINUM COMPOUNDS

Werner Huehn and Walfried Haufe, Ludwigshafen-on-the-Rhine, Germany; vested in the Alien Property Custodian No Drawing. Application May 12, 1938, Serial No. 207,573. In Germany May 15, 1937

3 Claims. (Cl. 204—94)

The present invention relates to the production of water-soluble basic aluminum compounds.

We have found that water-soluble basic aluminum compounds, namely basic aluminum salt solutions or aluminum hydroxide sols, can be prepared in a simple manner by electrolyzing aluminum salt solutions, separating the liquid formed in the cathode chamber and if desired evaporating or drying it. It is preferable to carry out the electrolysis with the employment of a diaphragm. When starting from aluminum chloride, an increase in the concentration of the aluminum ions and a decrease in the concentration of the chlorine ions takes place in the cathode chamber and the inverse process takes place in the anode chamber. By reason of the decomposition of water, an evolution of hydrogen takes place at the cathode, while at the anode, when suitable materials are used, as for example graphite, free chlorine is developed and can be collected separately and supplied to any desired use or burned with the hydrogen developed at the cathode to form hydrogen chloride.

In the cathode chamber there are formed during the electrolysis at first weakly basic aluminum salts, in the case of aluminum chloride for example $Al(OH)Cl_2$, later salts of higher basicity and finally aluminum hydroxide sols colloidally soluble in water. The electrolysis is interrupted before an essential amount of solid substances precipitates.

After completion of the electrolysis, the liquid is withdrawn from the cathode chamber. It may be concentrated or dried in the usual way, as for example by evaporation, if necessary by spray-drying. A white dry product is obtained which dissolves in water to give clear solutions without opalescence.

Suitable cathode materials are for example graphite, carbon, iron and mercury, while for the anode there are used aluminum or substances inert to chlorine, as for example graphite. As diaphragm material there may be used for example the substances usual in the electrolysis of alkali chlorides, as for example asbestos. Especially when using metallic cathodes, any metallic impurities present are separated from the aluminum salt solution, a purification thus being obtained.

As initial materials there may be mentioned for example aluminum chloride, aluminum bromide, aluminum nitrate and the like. Basic compounds may also be used as initial materials, in which case they are converted by the electrolysis into more strongly basic compounds.

It is advantageous to work with from 20 to 25 per cent solutions of aluminum chloride with a bath voltage of from about 4.2 to 4.5 volts and current densities of from 1800 to 2600 amperes per square meter. In this way current yields of from about 90 to 96 per cent of the theoretical yield are obtained; it is only when colloidal aluminum hydroxide sols having less than half an atom of chlorine per atom of aluminum are formed that the current yield falls off strongly.

The process is suitable inter alia for the working up of aluminum chloride waste liquors. It offers the advantage that free chlorine is obtained in addition to basic aluminum salts or aluminum hydroxide sols.

The basic aluminum salts, in particular the basic aluminum chlorides, obtainable according to this invention may be used with advantage as tawing salts; the aluminum hydroxide sols are suitable for the impregnation of textiles to which they impart water-repelling properties; they may also be used for the preparation of adsorption agents or catalytically active substances as well as in the paper and pharmaceutical industries.

The following examples will further illustrate how the said invention may be carried out in practice, but the invention is not restricted to these examples.

Example 1

In an electrolytic cell of 30 liters capacity of the usual kind, 30 liters of 20 per cent aluminum chloride solution are electrolyzed between graphite electrodes while using an asbestos diaphragm until the ratio of Al:Cl in the cathode chamber is 1:1.5. At a current density of 2000 amperes per square meter and a voltage of 4.2 volts, a current yield of 94 per cent, with reference to chlorine, is obtained.

The cathode liquid is separated and dried in vacuo or by atomization to a white product, clearly soluble, having a content of 34.4 per cent of $Al_2O_3$ and 36.0 per cent of chlorine.

The electrolysis may be continued after supplying fresh 20 per cent aluminum chloride solution to the cathode chamber and if desired adding aluminum chloride to the anode chamber.

Example 2

If the electrolysis described in Example 1 be carried on until the ratio of Al:Cl in the cathode chamber is 1:0.5, a current yield of 92 per cent is obtained at a current density of 1800 amperes per square meter and a voltage of 4.4 volts. By working up the cathode liquid in the manner described in Example 1, a white product, soluble clearly and without opalescence in water, is obtained having a content of from 50 to 55 per cent of $Al_2O_3$ and about 17 per cent of chlorine.

*Example 3*

Aluminum chloride waste liquor is electrolyzed while using a mercury cathode, under conditions otherwise identical with those described in Examples 1 and 2. Similar products are obtained.

What we claim is:

1. The process of producing water-soluble basic aluminum chlorides which comprises electrolyzing an aqueous solution of aluminum chloride substantially free from alkali metal salts in a diaphragm cell and withdrawing the liquid formed in the cathode chamber before a substantial amount of solid substances precipitates.

2. The process of producing water-soluble basic aluminum chlorides which comprises electrolyzing an aqueous solution containing from 20-25 per cent of aluminum chloride substantially free from alkali metal salts in a diaphragm cell with current densities of from 1800 to 2600 amperes per square meter and withdrawing the liquid formed in the cathode chamber before a substantial amount of solid substances precipitates.

3. The process of producing basic aluminum compounds which comprises electrolyzing an aqueous solution of aluminum chloride substantially free from alkali metal salts in a diaphragm cell using asbestos as the diaphragm material and graphite as the electrode material and withdrawing the liquid formed in the cathode chamber before a substantial amount of solid substances precipitates.

WERNER HUEHN.
WALFRIED HAUFE.